US011429619B2

(12) United States Patent
Agrawal et al.

(10) Patent No.: US 11,429,619 B2
(45) Date of Patent: Aug. 30, 2022

(54) HETEROGENOUS EDGES IN AN ONLINE NETWORK FOR BUILDING ACTIVE ONLINE COMMUNITIES

(71) Applicant: Microsoft Technology Licensing, LLC, Redmond, WA (US)

(72) Inventors: Parag Agrawal, Sunnyvale, CA (US); Peter Chng, Sunnyvale, CA (US); Bohong Zhao, San Jose, CA (US); Michael Maczka, San Jose, CA (US); Aastha Jain, Sunnyvale, CA (US); Andrew Yu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 16/775,757

(22) Filed: Jan. 29, 2020

(65) Prior Publication Data

US 2021/0232590 A1    Jul. 29, 2021

(51) Int. Cl.
*G06F 16/2457* (2019.01)
*G06N 20/00* (2019.01)
*G06F 16/248* (2019.01)
*H04L 12/46* (2006.01)
*H04L 51/52* (2022.01)

(52) U.S. Cl.
CPC ...... *G06F 16/24578* (2019.01); *G06F 16/248* (2019.01); *G06N 20/00* (2019.01); *H04L 12/4641* (2013.01); *H04L 51/52* (2022.05)

(58) Field of Classification Search
CPC . G06F 16/248; G06F 16/24578; H04L 51/32; H04L 12/4641; G06N 20/00; G06N 5/022
See application file for complete search history.

(56) References Cited

U.S. PATENT DOCUMENTS

| 9,292,580 B2* | 3/2016 | Mei ....................... G06F 16/248 |
| 10,685,477 B2* | 6/2020 | Giunio-Zorkin ........ G06T 15/20 |
| 10,783,162 B1* | 9/2020 | Montague ........... G06F 16/2465 |
| 2017/0004134 A1* | 1/2017 | Pepper, Jr. ......... G06F 16/24578 |
| 2019/0347340 A1* | 11/2019 | Wilczynski ........... G06F 16/256 |

* cited by examiner

*Primary Examiner* — Etienne P Leroux
(74) *Attorney, Agent, or Firm* — Nicholson De Vos Webster & Elliott LLP

(57) ABSTRACT

Techniques for generating and leveraging heterogenous edges in an online connection network are provided. In one technique, a particular user is identified. The identification may be made in response to a computing device of the particular user requesting data from a particular system. For each entity type of multiple entity types: (1) a set of entities of the entity type is identified based on one or more attributes of the particular user; (2) a ranking of the set of entities is generated based on one or more criteria; and (3) a subset of the set of entities is selected and included in a final set of entities. The final set of entities includes entities from different entity types of the multiple entity types. The final set of entities is transmitted over a computer network to be presented concurrently on a computing device of the particular user.

20 Claims, 6 Drawing Sheets

Your Connections 1,453
252

Your Hashtags 19

Invitations (1) Manage all

Christopher J Coggins (Sondr...
SR PRODUCT DESIGNER: MERN ✓
LEMP ✓  Heroku ✓  AWS ✓  Java
Sheng Yuan and 42 others 254
Ignore  Accept

Recommended for you 260
All  People  Hashtags

262
ComputerVision
Hashtag•65,509
Followers
Popular with people skilled in Machine Learning
Follow 264
Arpan Sahu
CEO at technorigger
28 mutual connections
Connect 266
OpenSourceSoftware
Hashtag•94,230
Followers
Popular with people skilled in C++
Follow

HETEROGENOUS EDGES IN AN ONLINE NETWORK FOR BUILDING ACTIVE ONLINE COMMUNITIES

TECHNICAL FIELD

The present disclosure relates generally to online networks and, more particularly, to building active online networks in a fast and scalable way.

BACKGROUND

The Internet has facilitated the ability to instantly communicate with each other over great geographical distances and in sharing information. One outgrowth of such communication and sharing is an online network provider to which online users register and through which online users are able to virtually connect with each other, forming their own individual online networks. However, not all connections from one online user to other online users are of equal value. Some online users contribute valuable information to their respective online networks while other online users contribute little to no information. Therefore, while recommending online users may have some utility, there is a natural limit to the number and quality of such recommendations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2B are screenshots of example user interfaces that present heterogenous entities to a viewer, in an embodiment;

DETAILED DESCRIPTION

Figure 1:
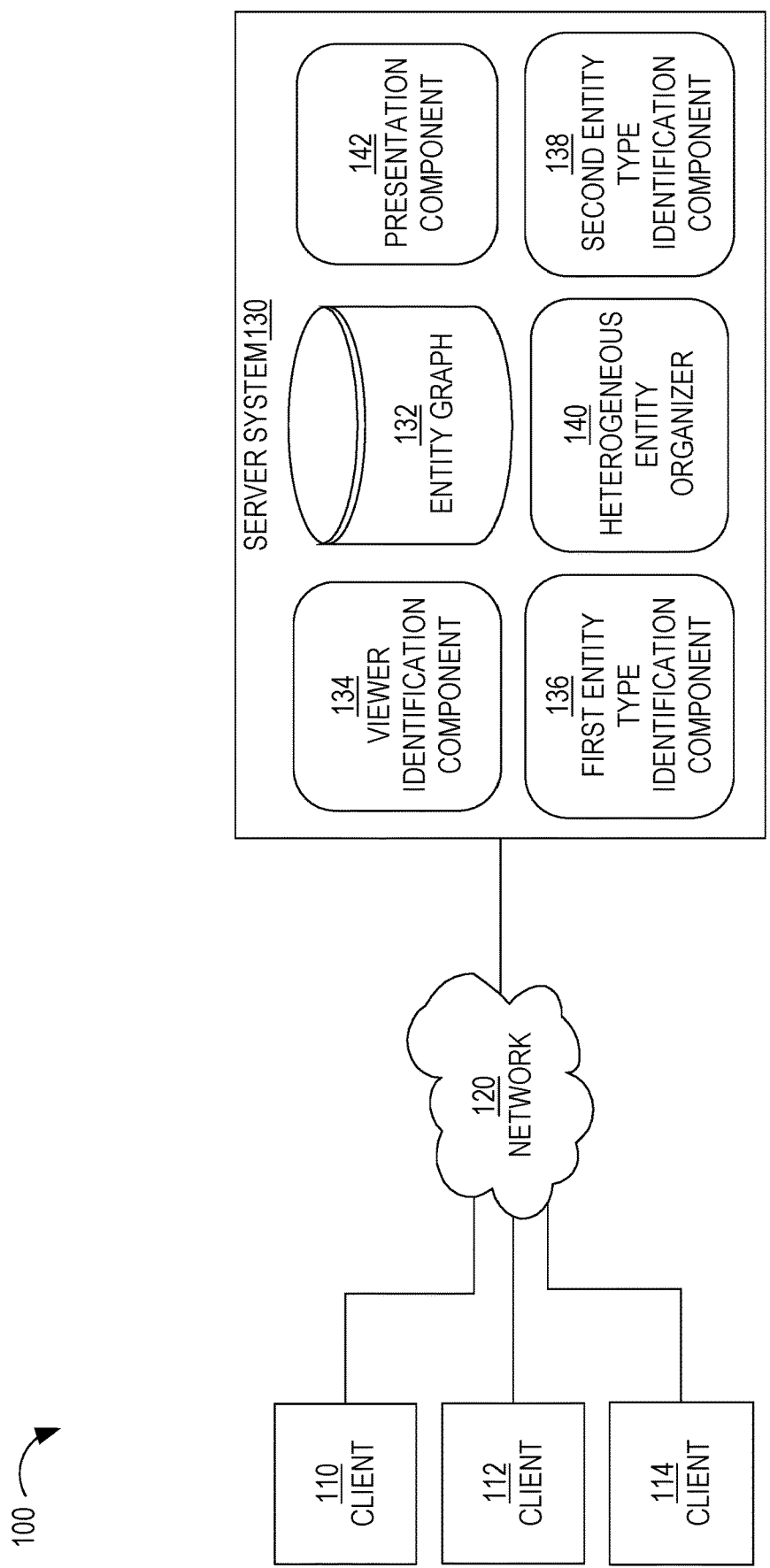
FIG. 1 is a block diagram that depicts an example system for generating recommendations of heterogenous entity types, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for assisting in the creation of active online communities using heterogeneous edges are provided. An entity graph comprises nodes representing different types of entities. Different types of entities from the entity graph are analyzed separately for relevance to a particular viewer or recipient. Different groups of entities corresponding to different entity types are presented concurrently on a computing device. The manner or order in which the groups of entities are presented may vary from one implementation to another.

Embodiments described herein improve computer-related technology. For example, embodiments allow for the creation of an individualized online network comprising heterogenous edges or edges of different types. Embodiments are flexible enough to incorporate virtually any type of edge. When users are allowed to create different types of edges, they are able to have diverse and active conversations over these edges within their respective connected networks.

Also, embodiments scale to any virtually any number of edges. Such scaling is possible using a parallel asynchronous architecture. In an embodiment, the described system comprises individual components working independently with their own set of data and functions. This allows edges to be added to the system very easily. In addition, this allows the system to be horizontally scalable in order to run on multiple server boxes.

Dividing the system into independent atomic components makes the system lightweight for engineers to quickly iterate, which is important in meeting frequently changing product requirements. Because each component is independent (e.g., one component that identifying a set of candidate entities of a first type and another component that identifies a set of candidate entities of a second type), engineers of one component are not required to understand other components and, thus, can exclusively focus on their component. This meta improvement leads to better system usability.

The system design allows for the incorporation of a new type of edge without incurring any additional latency. Also, one implementation of the second pass ranking component ensures that adding a new edge adds only a constant amount of time, which results in graceful scaling even in light of increased complexity.

Although embodiments refer to inserting entities into slots or into electronic content, what is being inserted are "identities of entities," not the entities themselves. For example, inserting a group into a slot is shorthand for inserting an identity of the group into the slot. As another example, inserting a company into a slot is shorthand for inserting an identity of the company into the slot.

System Overview

FIG. 1 is a block diagram that depicts an example system 100 for generating recommendations of heterogenous entity types, in an embodiment. System 100 includes clients 110-114, network 120, and server system 130.

Each of clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of clients 110-114 may be implemented in hardware, software, or a combination of hardware and software. Although only three clients 110-114 are depicted, system 100 may include many more clients that interact with server system 130 over network 120.

Network 120 may be implemented on any medium or mechanism that provides for the exchange of data between clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes an entity graph 132, a viewer identification component 134, a first entity type identification component 136, a second entity type identification component 138, heterogeneous entity organizer 140, and a presentation component 142. While only two entity type identification components are depicted, server system 130 may include more than two entity type identification components, one for each additional entity type. Each of these elements of server system 130 is described in more detail herein and may be implemented in hardware, software, or a combination of hardware and software.

Although depicted as a single element, server system 130 may comprise multiple computing elements and devices, connected in a local network or distributed regionally or globally across many networks, such as the Internet. Thus, server system 130 may comprise multiple computing elements other than the depicted elements.

Entity Graph

Entity graph 132 is a graph of nodes and edges that connect the nodes in the graph. Entity graph 132 comprises nodes and edges that connect nodes in the graph. Each node represents a particular entity and each entity is of a particular type. Examples of entity types include person, organization (e.g., company), group, event, hashtag, and series.

For example, a person node may be connected to a company node if a profile of the corresponding person lists the corresponding company as the person's employer. Thus, the edge that connects these two nodes may be an "employed by" type of edge and the edge is directed in that the person node points to the company node. Additionally or alternatively, an edge that connects the two nodes may be an "employs" type of edge and the edge is directed in that the company node points to the person node. As another example, a person node may be connected to a company node if the corresponding person has elected to "follow" the corresponding company online. In response to such an election, a "follow" type of edge is created that points from the person node to the company node.

As another example, a first person node is connected to a hashtag node with a "created" type of edge and the hashtag node is connected to a second person node with a "followed by" type of edge. Thus, the first person corresponding to the first person node created the hashtag corresponding to the hashtag node and the second person corresponding to the second person node followed that hashtag.

As another example, a first person node is connected to an event node with a "created" type of edge and the event node is connected to a second person node with a "registered" type of edge. Thus, the first person corresponding to the first person node created the event corresponding to the event node and the second person corresponding to the second person node registered for the event. Additionally or alternatively, the second person may have added the event to his/her calendar; thus, a "calendared" type of event may connect the second person node to the event node.

As another example, a first person node is connected to a series node with a "created" type of edge and the series node is connected to a second person node with a "subscribed to" type of edge. Thus, the first person corresponding to the first person node created the series corresponding to the series node and the second person corresponding to the second person node subscribed to that series. Thereafter, the second person may be notified through a software application whenever a new episode or other content is added to the series.

Embodiments are not limited to how entity graph 132 is stored in persistent storage. For example, nodes of one entity type may be stored separately from nodes of other entity types. Also, nodes may be stored as records (or rows) in a relation (or table) and edges may be references that are found in records and that reference other records. For example, one table may store people nodes and another table may store hashtag nodes. If a person node is connected to a hashtag node, then a particular row in the person table for the person node includes a reference to a particular row in the hashtag table for the hashtag node. If a first person node is connected to a second person node (indicating that the corresponding individuals are connected in an online network), then a row in the person table for the first person node includes a reference to a another row in the person table for the second person node. Other example databases other than relational databases include an object-oriented database, a graph database, and a NoSQL database.

Viewer Identification Component

Viewer identification component 134 identifies a viewer to which heterogenous nodes may be presented. For example, viewer identification component 134 determines that server system 130 receives a request for recommendations from one of clients 110-114. Viewer identification component 134 identifies an identifier within the request. The identifier may be a member or user identifier, a browser identifier, an IP address, or a device identifier, such as a MAC address. Thus, the identifier included in the request may directly identify a particular user or may be used to lookup an identifier for the particular user. For example, a browser identifier may be associated with a particular user identifier.

Alternative to receiving a request from a client device, viewer identification component 134 may be triggered in response to one or more other criteria, such as the lapse of a particular period of time. For example, a set of heterogenous nodes is identified for a particular user on a daily basis, such as in an email or regardless of whether the particular user visits a website hosted by (or otherwise affiliated with) server system 130. Thus, the set of heterogenous nodes may be identified and available in anticipation of the particular user visiting the website.

Entity Type Identification Components

As indicated in the depicted embodiment, server system 130 includes first entity type identification component 136 and second entity type identification component 138 and may include additional entity type identification components. Each entity type identification component (ETIC) identifies candidate entities of a different type for presentation. For example, first ETIC 136 identifies candidate people while second ETIC 138 identifies candidate hashtags. Other ETICs (not depicted) may identify candidate groups and events, respectively.

Each ETIC ranks its respective candidate entities according to one or more criteria. For example, each ETIC may implement a (e.g., machine-learned) model that generates a score for each candidate entity that the ETIC considers. The criteria (e.g. input features) that are taken into account by each ETIC may be different than the criteria of other ETICs. Even if the criteria or input features of two ETICs are the same, the weights or coefficients associated with each criterion or input feature may be different. Each ETIC may implement its own score threshold where only candidate entities whose score is above (or below) the score threshold are considered for ranking. Thereafter, each candidate entity is ordered or ranked based on score.

As another example, other criteria may be used to rank each candidate entity, regardless if a model produced a score for the candidate entity. For example, a score may be used to filter out candidate entities, but one or more input parameters to the corresponding model may be used to rank the remaining candidate entities, i.e., the ones that have not been filtered out.

In a related embodiment, the one or more criteria that are used to rank candidate entities of one type are different than the one or more criteria that are used to rank candidate entities of another type. For example, the one or more criteria of a first entity type may pertain to a first objective (e.g., clicks or views or revenue) that is different than a second objective (e.g., length or number of user sessions) pertaining to a second entity type that is different than the first entity type.

Random Shuffle

Heterogeneous entity organizer 140 organizes or orders entities from different ETICs according to one or more criteria. The order in which the entities are organized depends on the one or more criteria.

In an embodiment, heterogeneous entity organizer (HEO) 140 implements a random shuffle technique that first randomly assigns different entity types to different available slots in electronic content (e.g., a web page or a view generated by a native application executing on a client device) and then inserts a set of entities, into the assigned slots, based on their respective ranking or ordering from their respective ETIC. (A slot is an area or portion of electronic content into which a content item may be inserted and the content item is not determined until runtime when the electronic content is requested.) For example, HEO 140 determines that seven slots will contain identities of two types of entities: people (P) and hashtags (H). The random entity type slot assignment may result in the following: P, H, H, P, H, P, H. The first ETIC 136 identifies P1, P2, and P3 and second ETIC 136 identifies H1, H2, H3, and H4. Based on the random entity type slot assignment and the ranking of the respective ETICs, HEO 140 assigns the individual entities to the seven slots as follows: P1, H1, H2, P2, H3, P3, H4. Thus, the ordering of each set of entities of a particular type is preserved. For example, P1 appears before P2, and P2 appears before P3.

The following is an example technique for randomly assigning different slots to different entity types. First, an array A of size S is created. Concurrently or separately, each entity type (ET) is assigned a number of entities (r). For example, the person entity type is assigned three slots, the hashtag entity type is assigned four slots, and the event entity type is assigned six slots. Thus, r1 slots of array A are assigned to ET1, r2 slots of array A are assigned to ET2, r3 slots of array A are assigned ET3, and so on for each entity type. After this step, array A may look like the following: [ET1, ET1, . . . , ET2, ET2, . . . , ETn, ETn . . . ].

Then, for each index i into array A, from S−1 down to 1, generate a random integer j that is between 1 and i. The random integer j may be equal to 1. Then P[j] is exchanged with P[i]. After each index is considered and an exchange is performed for each index, an example array might b [ET2, ETn, . . . , ET2, ET1, . . . , ET1, ETn . . . ]. Such an array is a randomly shuffled array.

In this randomly shuffled array, slots marked with ET1 are replaced with E11, E12, . . . E1r1 in order, slots marked with ET2 are replaced with E21, E22, . . . E2r2 in order, and so forth for each entity type. Thus, in this technique, the order of entities within each entity type is not shuffled. It may be assumed that the individual ETICs generate the best-ranked set of entities. Therefore, there is no need to shuffle entities within each entity type to remove bias.

An example of a result of implementing this technique on array A is the following: [E21, En1, . . . , E22, E11, . . . , E23, En2 . . . ]. This array is a random permutation where each entity type is uniformly shuffled but recommendations within a single entity type are in order.

This example technique takes O(S) time in total and constant-time (O(1) time) for each entity type. Extending to another entity type is thus O(1) or constant-time.

This example technique may be implemented for each presentation of a set of heterogeneous entities to a user recipient. For example, a viewer visits, at time T1, a webpage that includes an area for presenting a set of heterogeneous entities. The webpage may be designated as an online network page that allows the viewer to view recommendations of entities of different entity types with which to interact. The set of heterogeneous entities is based on a randomly shuffled array as follows: [ET3, ET2, ET1, ET3, ET2]. The viewer then visits the webpage again at time T2 and the set of heterogeneous entities presented therein is based on another randomly shuffled array as follows: [ET2, ET1, ET3, ET3, ET2]. Thus, in an embodiment, a new randomly shuffled array is selected (or even generated) for each presentation of a set of heterogeneous entities.

Therefore, HEO 140 inserts different sets of entities into an array according to a randomly shuffled array, resulting in a set of heterogeneous entities.

In a related embodiment, many randomly shuffled arrays are generated initially and selected at runtime and used to order a set of heterogeneous entities. In this way, there is no runtime latency to generate a randomly shuffled array. The runtime selection of a randomly shuffled array may be a random process, such as generating a random number and computing mod N, where N is the number of previously-generated randomly shuffled arrays.

Pre-Assigned Slots

In an alternative embodiment, entity types are pre-assigned to slots and that assignment is used thereafter for all generated sets of heterogeneous entities, regardless of the identity of the viewer. An example of a pre-assigned array is as follows: [ET1, ET2, ET3, ET1, ET2, ET3, ET1, ET2, ET3, ET1, ET2, ET3]. Another example of a pre-assigned array is as follows: [ET1, ET1, ET2, ET2, ET3, ET3, ET1, ET1, ET2, ET2, ET3, ET3].

Usage-Based Assignment of Slots

In an alternative embodiment, entity types are assigned to slots based on usage history of a particular viewer or a set of viewers (e.g., all viewers). For example, if more viewers are selecting hashtag recommendations than any other type of entity recommendation, then slots for hashtags are ranked higher than slots for other types of entities. As another example, if a particular viewer last selected a person recommendation, then the first slot for the particular viewer is assigned a person entity type. As another example, a set of selections of entity recommendations by a particular viewer over a period of time (e.g., the last thirty days) is tracked and analyzed. The entity type that was selected the most is assigned to the first slot for the particular viewer, the entity type that was selected the second most is assigned to the second slot for the particular viewer, and so forth.

Presentation

The slots of an array (whether randomly shuffled or pre-arranged) may correspond to pre-defined slots in a web page, a view, or other online content, whether in a large display or a small display, such as a display of a smartphone. Depending on the type of display, there may be a different number of available slots into which entities are inserted. For example, for a typical smartphone display, the number of available slots is six, while for a typical desktop display, the number of available slots is fifteen. In one embodiment, HEO 140 takes into account the number of available slots when assigning entities to slots. Alternatively, presentation component 142 takes into account the number of available slots when determining what to present.

Presentation component 142 receives a set of heterogenous entities from HEO 140 in a particular order and includes each heterogenous entity in the assigned slot based on the particular order. Presentation component 142 includes, in a slot, (a) the actual content (e.g., image and text) of the heterogenous entity assigned to the slot or (b) a reference to the actual content. If (b), then the client device uses the reference to retrieve the actual content from a remote source, such as a content delivery network (CDN).

Presentation component 142 also organizes content that is received from sources other than HEO 140. For example, in the context of a web page, presentation component 142 determines a pre-defined format of the web page, where different portions of the web page correspond to different sources. Presentation component 142 inserts content from the different sources (or references to the content) into the appropriate portions of the web page, according to the pre-defined format.

Presentation component 142 causes the organized content (including the heterogenous entities) to be transmitted over a computer network (e.g., network 120) to a computing device (e.g., client 112) of the viewer. The organized content may come in the form of an HTML or XHTML page.

Example User Interfaces

Figure 2A:
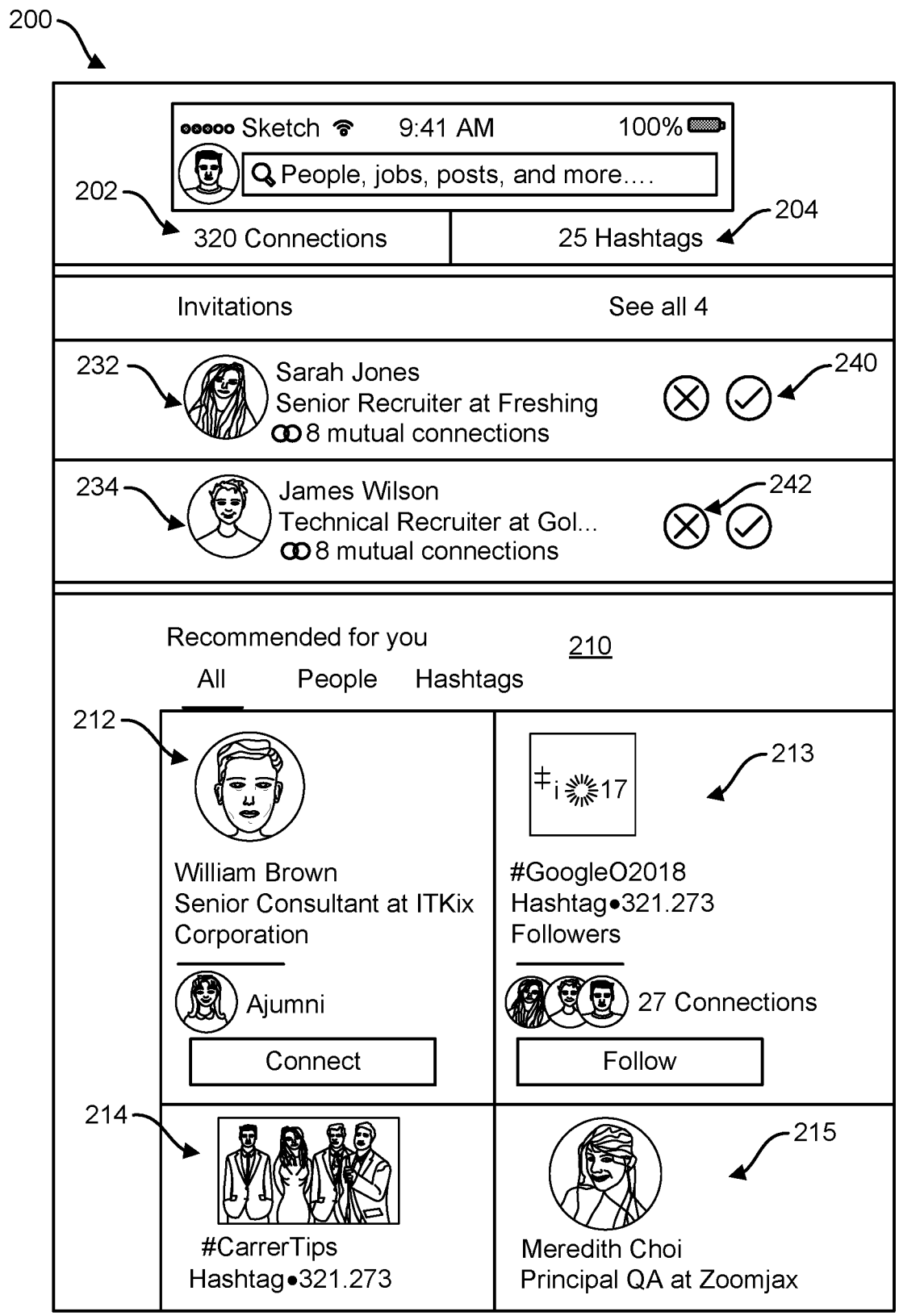

FIG. 2A is a screenshot of an example user interface 200 on a computing device (e.g., a smartphone) with a relatively small display screen, in an embodiment. User interface 200 is tailored to a particular viewer, who may be a registered user/member of an online (social) network service. For example, user interface 200 indicates a current number of connections 202 that the particular viewer has created with other users of the online network service (320 in this example) and a current number of hashtags 204 that the particular viewer is currently following (25 in this example). "Following a hashtag" means that the particular viewer is able to view articles, postings, or other online content that is associated (or tagged) with the hashtag and that is created/posted by other users.

User interface 200 includes a recommendation section 210 that includes four recommended entities 212-215. Recommended entities 212 and 215 are of entity type person, while recommended entities 213 and 214 are of entity type hashtag. User interface 200 also includes three tabs: all tab 220, people tab 222, and hashtag tab 224. Recommended entities 212-215 are displayed when all tab 220 is selected. If people tab 222 is selected, then only entities of type person are displayed, such as recommended entities 212 and 215 (but not recommended entities 213 and 214). Similarly, if hashtag tab 224 is selected, then only entities of type hashtag are displayed, such as recommended entities 213 and 214 (but not recommended entities 212 and 215). If user interface 200 is scrolled, then additional recommended entities may be displayed.

In this depicted example, each recommendation entity includes information about the recommended entity. The type of information may vary from entity type to entity type. For example, for person entity types, the information includes a first name, last name, job title, employer name, and one or more commonalities that the recommended person has with the viewer. As a specific example, recommended entity 212 indicates that William Brown is an alum from the same university as the viewer. As another example, for hashtag entity types, the information includes a name of the hashtag, a number of followers of the hashtag, and a number of connections of the viewer that also follow the hashtag. As a specific example, recommended entity 213 indicates that hashtag #GoogleO2018 has 321,273 followers and that 27 of the viewer's connections/friends follow that hashtag.

Each recommendation includes a call-to-action (CTA) button. Different entity types may be associated with different CTAs. For example, recommended entities of the person type are associated with a "connect" CTA. Thus, when a viewer selects the CTA button of a recommended person, a connection invitation is automatically sent to an account of the corresponding user. When the corresponding user logs into his/her account, then that user will be presented with the connection invitation. If that user accepts the connection invitation, then the user and the person that selected the CTA button will be connected in (or "friends") an online network. Each user will have access to the other's online network of connections/friends, interests, etc.

Recommended entities of the hashtag type are associated with a "follow" CTA. When a viewer selects the CTA button of a recommended hashtag, server system 130 automatically associates the viewer with the recommended hashtag. Thereafter, the viewer is able to see online content that is associated (or tagged) with the hashtag. Such content may be automatically presented to the viewer in the viewer's online feed and/or as a separate notification that is pushed to the viewer's computing device. Alternatively, the viewer may have to manually select the hashtag in a list of hashtags in order to view content that has been recently associated (or tagged) with the hashtag.

User interface 200 also includes two invitations 230-232 from two registered users of an online network provider. Each invitation is associated with an accept button 240 and a decline button 242.

FIG. 2B is a screenshot of an example user interface 250 on a computing device (e.g., a desktop computer) with a relatively large display screen. Similar to user interface 200, user interface 250 is tailored to a particular viewer, who may be a registered user/member of an online (social) network service. However, the formatting of user interface 250 is different than the formatting of user interface 200 due to the different screen sizes.

While both user interfaces indicate a number of connections, a number of hashtags followed, and a connection invitation, the amount of information for each in user interface 250 is greater. For example, the number of connections 252 is accompanied with profile images of a subset of the viewer's connections. As another example, the connection invitation 254 in user interface 250 includes skills of the inviter and a name of a shared connection of the inviter and the viewer.

Like user interface 200, user interface 250 includes a recommendation section 260 that includes a number of recommended entities 262-266. Recommended entities 262 and 266 are of entity type hashtag while recommended entity 264 is of entity type person. Each of recommended entities 262 and 266 include information about followers of the hashtag, other than the number. For example, recommended entity 262 indicates that hashtag #ComputerVision is popular with people that are skilled in machine learning, or at least with people that list "machine learning" as a skill in their respective online profiles. As another example, recommended entity 266 indicates that hashtag #OpenSourceSoftware is popular with people that are skilled in C++, or at least with people that list "C++" as a skill in their respective online profiles.

Parallelization

Figure 3:
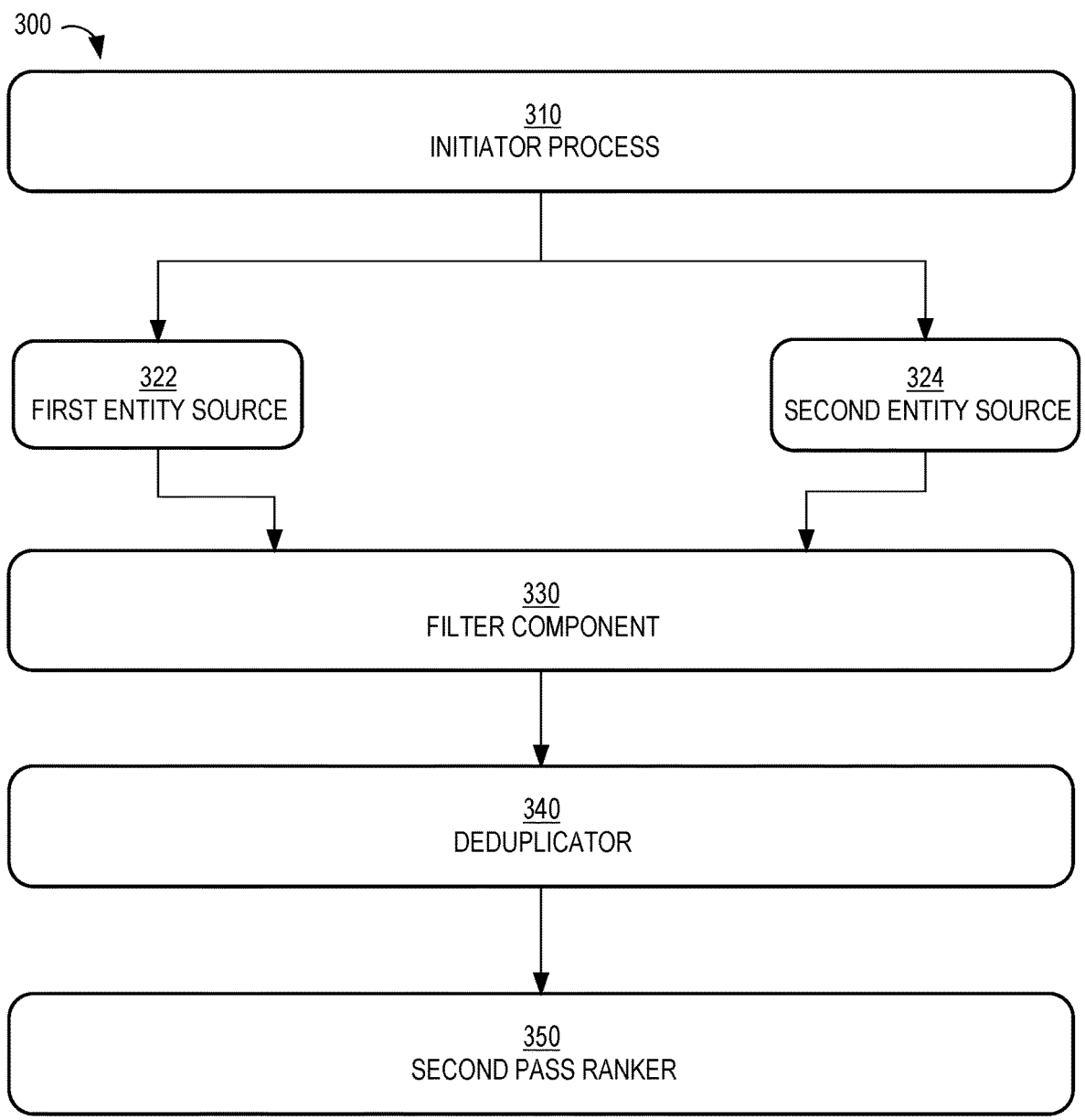
FIG. 3 is a block diagram that depicts an example process flow for generating a set of heterogenous entities, in an embodiment.

In an embodiment, first and second ETICs execute in parallel in identifying entities of different types for a particular user in response to, for example, a request initiated by the particular user. FIG. 3 is a block diagram that depicts an example process flow 300 for generating a set of heterogenous entities, in an embodiment. Process flow 300 may be implemented by HEO 140. Process flow 300 includes an initiator process 310, a first entity source 322, a second entity source 324, a filter component 330, a deduplicator 340, and a second pass ranker 350. Even though FIG. 3 includes arrows that connect entity sources 322-324 to filter component 330, filter component 330 to deduplicator 340, and deduplicator 340 to second pass ranker 350, this does not necessarily mean that element at the source of an arrow is communicating with the element at the target of the arrow. Instead, the arrows illustrate that the main lines of execution follow in a certain order. However, as described herein, initiator process 310 may be the only element that is communicating directly with (e.g., calling) each of the other elements depicted in FIG. 3.

Initiator process 310 receives a call to generate a set of heterogenous entities. Initiator process 310 calls each of entity sources 322-324, each representing a different first pass ranker or source of entities. Entity sources 322-324 may correspond to ETICs 136-138. Entity sources 322-324 represent a first phase in execution. For example, first entity source 322 identifies a set of entities of a first type (e.g., people) while second entity source 324 identifies a set of entities of a second type (e.g., hashtags) that is different than the first type. Entity sources 322-324 are executed in parallel.

Each of entity sources 322-324 includes instructions to store intermediate results in a particular location in storage, whether volatile storage or non-volatile storage. For example, first entity source 322 stores identities of a first set of entities in a first portion of a shared data object (e.g., a Java object) and second entity source 324 stores identities of a second set of entities in a second portion of the shared data object. The shared data object is accessible to other components in process flow 300. The storage location may be specified by initiator process 310. The size and structure of the storage location may be dictated by a configuration file that indicates a number and size of arrays. Initiator process 310 uses the configuration file in generating parameter values for each call.

For example, the call from initiator process 310 to an entity source may indicate the shared data object and/or storage location. As a specific example, the call may include a reference to the shared data object, an array identifier that uniquely identifies an array (from multiple arrays) within the shared data object, and a size of the array identified by the array identifier. A entity source uses the reference and the array identifier (and, optionally, the array size) to write data to (or read data from) the shared data object.

Filter component 330 is an optional component. Filter component 330 represents a second phase and is called when the previous phase concludes. For example, each of entity sources 322-324 includes instructions to send a message to initiator process 310 when execution of the entity source concludes.

In an embodiment, initiator process 310 includes instructions for calling filter component 330 when initiator process 310 receives the appropriate message from all of entity sources 322-324 in the first phase. The call may include a reference to the particular storage location (e.g., the shared data object) and include other information, such as the number of arrays in at the particular storage location. One purpose of filter component 330 is to filter or remove entities from one or more sets of entities identified by entity sources 322-324. For example, filter component 330 may analyze one or more attributes of entities recorded in the shared data object and determine which entities (if any) should be removed. Such removal may be to prevent low quality or likely spam entities from being presented on a computing device to a user of the computing device. Filter component 330 may use the same filter criteria for all identified entities. Entity sources 322-324 may also implement their own respective filter mechanisms to remove such entities, but filter component 330 may apply different filter criteria.

Deduplicator 340 is an optional component. Deduplicator 340 represents a third phase and is called when the previous phase (e.g., involving filter component 330) concludes. For example, filter component 330 includes instructions to send a message to initiator process 310 when execution of filter component 330 concludes.

In an embodiment, initiator process 310 includes instructions for calling deduplicator 340 when initiator process 310 receives the appropriate message from filter component 330 in the second, or previous, phase. The call may include a reference to the particular storage location (e.g., the shared data object) and include other information, such as the number of arrays in at the particular storage location. One purpose of deduplicator 340 is ensure that there are no duplicate recommended entities from a previous set of recommendations. For example, during one user session of a particular viewer, a first set of entity recommendations was presented to the particular viewer. During a subsequent user session of the particular viewer, a second set of entity recommendations is presented to the particular viewer, but deduplicator 340 ensures that no entity recommendation in the second set was also in the first set; if so, then deduplicator 340 first removes that entity recommendation from the second set prior to presenting the second set to the particular viewer.

Second pass ranker 350 represents a fourth or subsequent phase and is called when the previous phase completes. For example, deduplicator 340 includes instructions to send a message to initiator process 310 when execution of deduplicator 340 concludes. In an embodiment, initiator process 310 includes instructions for calling second pass ranker 350 when initiator process 310 receives the appropriate message from deduplicator 340 in the third phase. (Deduplicator 340 might not send a message after a certain lapse of time or may send a message indicating that deduplicator 340 failed, in which cases initiator process 310 might end and send a failure message to the process that initially called initiator process 310.)

The call from initiator process 310 to second pass ranker 350 may include data that identifies the particular storage location (e.g., a shared data object) and, optionally, a way to reference or access each array associated with the particular storage location. For example, the call may include a reference to the shared data object and a number and size of each array in the shared data object.

Second pass ranker 350 may perform the random shuffle described herein. Second pass ranker 350 accesses the entities of different types from the particular storage location. Second pass ranker 350 may return a list of heterogenous entities (or a simply a message indicating that the second pass ranker 350 is complete) to initiator process 310 when the shuffling (or ordering) of the entities of the different types is complete. The list may be stored at the particular storage location that is accessible to initiator process 310.

Adding a New Entity Type

In an embodiment, adding a new entity type to a set of recommended entities may be performed in constant time, at runtime. Backend system changes to server system 130 to add a new entity type may be relatively straightforward without adding runtime latency. For example, entity sources 322-324 execute in parallel and represent different first pass rankers of different types of entities. Thus, adding, to the first stage of process flow 300, another entity source that represents another first pass ranker and executes in parallel with entity sources 322-324 should not add much (if any) latency to the first stage. If the new code block takes, on average, longer to execute than another entity source, then the difference in times will represent the added latency, which should be negligible.

Process Overview

Figure 4:
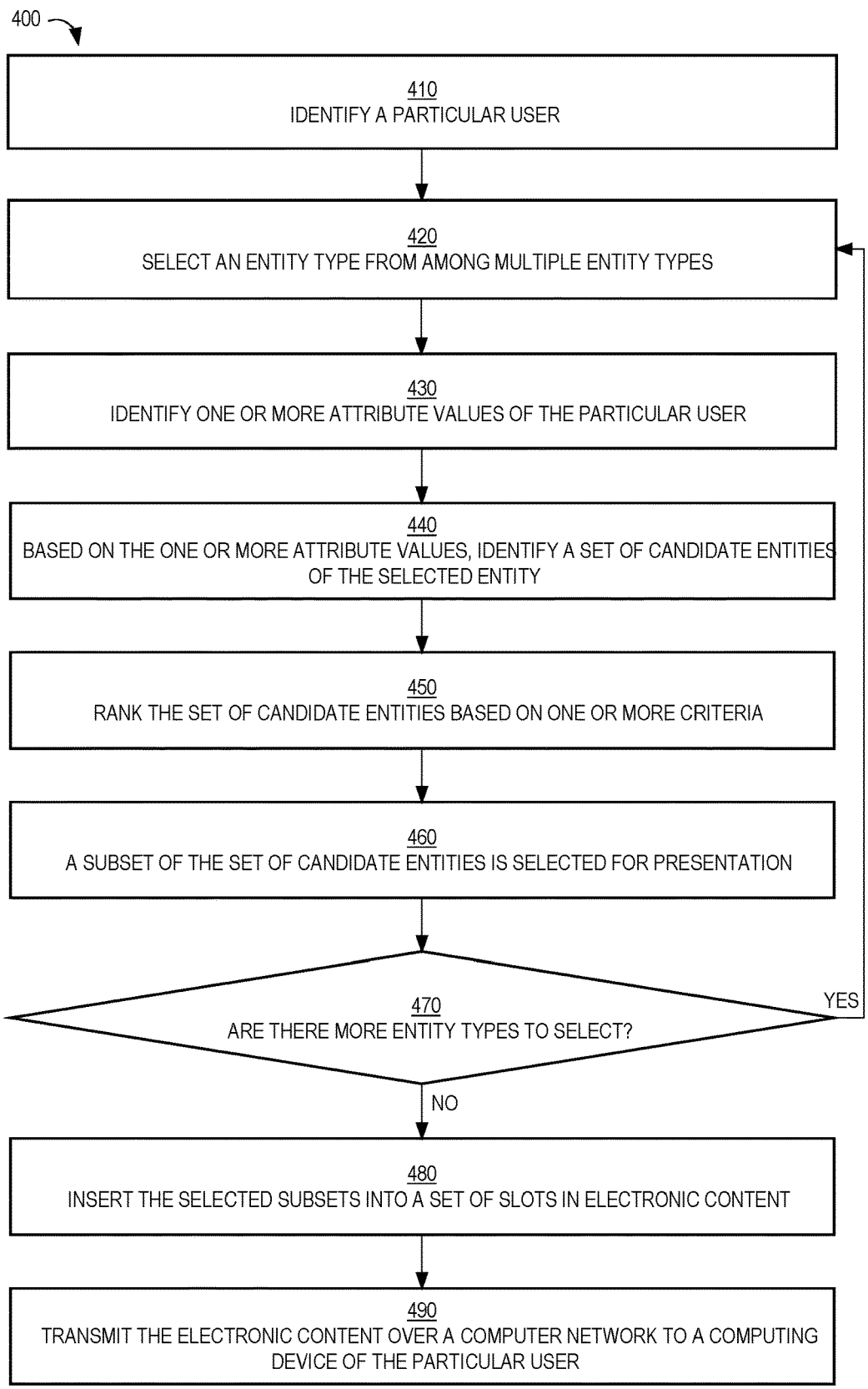
FIG. 4 is a flow diagram that depicts an example process for providing recommendations of heterogenous entity types, in an embodiment.

FIG. 4 is a flow diagram that depicts an example process 400 for providing recommendations of heterogenous entity types, in an embodiment. Process 400 may be implemented by one or more elements of server system 130.

At block 410, a particular user is identified. Block 410 may be performed by viewer identification component 134. Block 410 may be initiated in response to a content request that the particular user initiates with his/her computing device. For example, the particular user may select a software icon representing a client (e.g., native) application that is installed on the particular user's smartphone, which selection causes the client application to launch and a home page to be presented, which home page includes a recommended entity section. Alternatively, block 410 may be initiated regularly after the passage of a certain amount of time or after the completion of process flow 300, which may be executed on a periodic basis (e.g., daily).

At block 420, an entity type from among multiple entity types is selected. The selection may be random, as long as the entity type has not yet been selected for the current iteration of process 400. Example entity types include person, hashtag, group, series, and event. Block 420 may be performed in parallel such that multiple entity types are selected concurrently and different instances of blocks 430-460 are performed in parallel.

At block 430, one or more attribute values of the particular user are identified. The attribute values identified may depend on entity type. For example, one set of attribute values of the particular user is identified if the entity type is person and a different set of attribute values of the particular user is identified if the entity type is hashtag. For example, different entity types are associated with different set of input features. The attribute values may come from an online profile database, which may be part of entity graph 132. Block 430 may be performed by one of ETICs 136-138.

At block 440, a set of candidate entities of the selected entity type is identified based on the identified attribute values. Block 440 may be performed by one of ETICs 136-138. For example, ETIC 136 selects a set of candidate people while ETIC 138 selects a set of candidate hashtags.

At block 450, the set of candidate entities are ranked based on one or more criteria that are associated with the selected entity type. For example, ETIC 136 ranks a set of candidate people based on scores (for the set of candidate people) generated by a machine-learned model invoked by ETIC 136 while ETIC 138 ranks a set of candidate hashtags based on scores (for the set of candidate hashtags) generated by a different machine-learned model invoked by ETIC 138.

Alternatively, one or more criteria may be unique to the selected entity type. For example, a set of candidate people is ranked based on one relevance measure while a set of candidate hashtags is ranked based on a different relevance measure.

At block 460, a subset of the set of candidate entities is selected for presentation. The number of candidate entities in the subset may depend on the selected entity type. For example, five candidate people are selected while three candidate hashtags are selected.

At block 470, it is determined whether there are additional entity types that have not yet been selected. If so, process 400 returns to block 420; otherwise, process 400 proceeds to block 480. Alternatively, different processes perform different instances of blocks 430-460 in parallel. Therefore, block 470 is avoided.

At block 480, the selected subsets are inserted into a set of slots in electronic content. Each slot may be pre-assigned to a certain entity type. The entity type-slot assignment may be determined dynamically (e.g., after process 400 begins) or may have been determined previously, or prior to (or irrespective of) any request from the particular user. Insertion may involve including content associated with each selected candidate entity in a slot or including a reference to the content in the slot. Thereafter, when the electronic content is processed on a client device, the client device (e.g., a web browser, or a native application, executing thereon) returns the content using the corresponding reference. After insertion, the electronic content includes the selected subsets (and/or references to the individual selected candidate entities).

At block 490, the electronic content that includes the selected subsets is transmitted to a computing device of the particular user to be concurrently displayed thereon. For example, presentation component 142 transmits the electronic content over a computer network to the computing device, which causes the selected subsets to be presented on a display screen of the computing device. Block 490 may be triggered when the particular user visits a website (or logs into an account of the particular user) hosted by server system 130.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
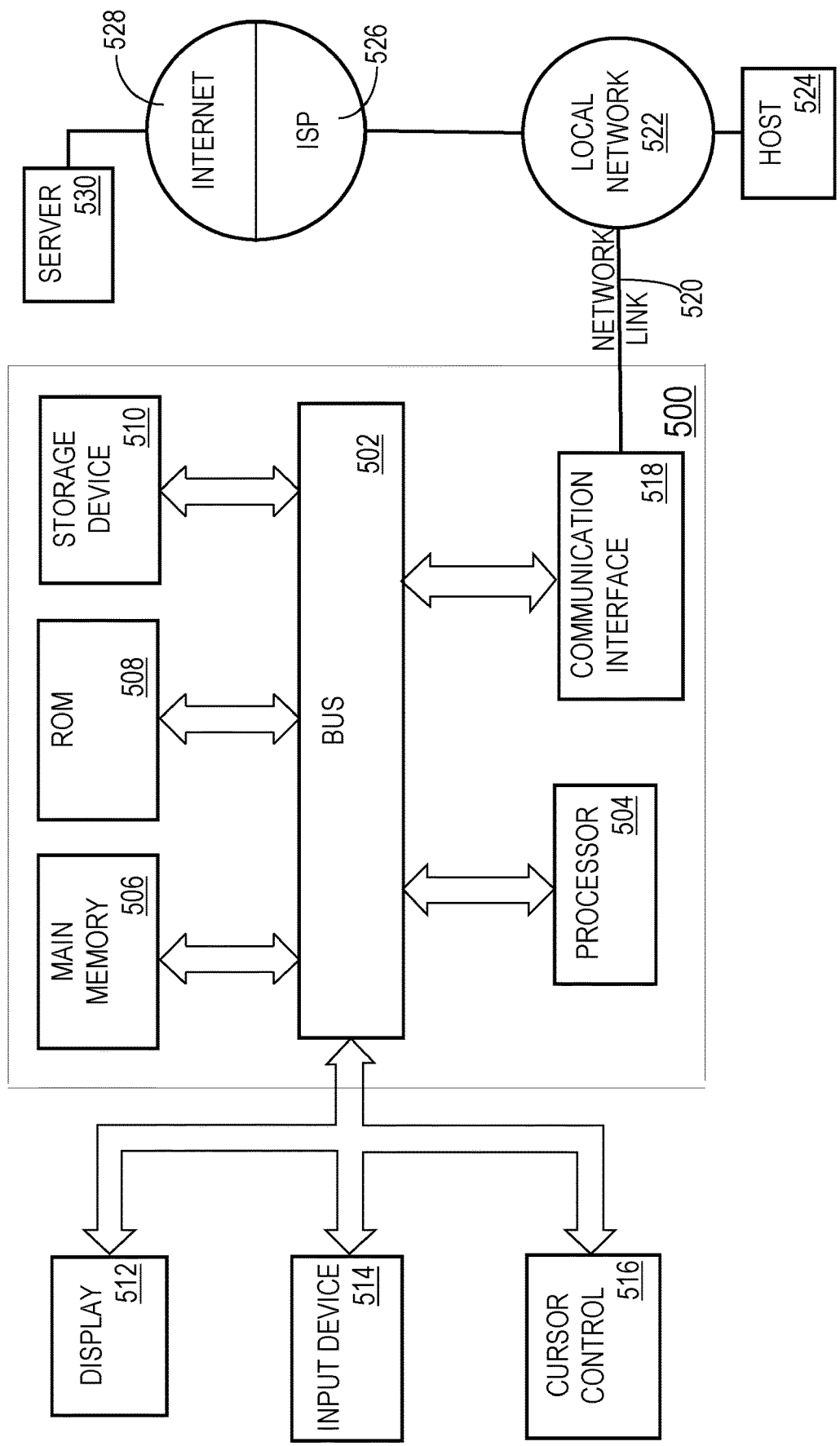
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a particular user;
   for each entity type of a plurality of entity types:
      based on one or more attributes of the particular user, concurrently for said each entity type, identifying a set of entities of said each entity type;
      generating a ranking of the set of entities based on one or more criteria;
      selecting a subset of the set of entities and including the subset in a final set of entities;
   wherein the final set of entities includes entities from different entity types of the plurality of entity types;
   causing the final set of entities to be presented concurrently on a computing device of the particular user;
   wherein the method is performed by one or more computing devices.

2. There method of claim 1, further comprising:
   receiving a request from the computing device, wherein ranking the set of entities is performed in response to receiving the request.

3. The method of claim 1, wherein:
   selecting a first subset of a first set of entities of the first entity type of the plurality of entity types is performed by a first entity identification component;
   selecting a second subset of a second set of entities of the second entity type of the plurality of entity types is performed by a second entity identification component;
   the method further comprising:
      notifying, by the first entity identification component, an initiator process after the first entity identification component selects the first subset of the first set of entities;
      notifying, by the second entity identification component, the initiator process after the second entity identification component identifies the second subset of the second set of entities;
      notifying, by the initiator process, a second pass ranker only after being notified by both the first entity identification component and the second entity identification component.

4. The method of claim 1, wherein the plurality of entity types includes two or more of person, hashtag, learning series, event, or group.

5. A method comprising:
   identifying a particular user;
   for each entity type of a plurality of entity types:
      based on one or more attributes of the particular user, identifying a set of entities of said each entity type;
      generating a ranking of the set of entities based on one or more criteria:
      selecting a subset of the set of entities and including the subset in a final set of entities;
   wherein the final set of entities includes entities from different entity types of the plurality of entity types;
   causing the final set of entities to be presented concurrently on a computing device of the particular user;
   wherein the method is performed by one or more computing devices;
   for each entity type of the plurality of entity types, identifying a number of entities of said each entity type to include in the final set of entities;
   randomly assigning entity types to each slot of a plurality of slots in which to insert the final set of entities, wherein the number of entities in the final set of entities is the same as the number of slots in the plurality of slots;
   for each entity type of the plurality of entity types, based on the ranking of the set of entities of said each entity type, assigning each entity, in the subset of entities of said each entity type, to a slot of the plurality of slots;
   wherein the plurality of slots maintain the ranking of the set of entities of each entity type of the plurality of entity types.

6. A method comprising:
   identifying a particular user;
   for each entity type of a plurality of entity types:
      based on one or more attributes of the particular user, identifying a set of entities of said each entity type;
      generating a ranking of the set of entities based on one or more criteria;
      selecting a subset of the set of entities and including the subset in a final set of entities;
   wherein the final set of entities includes entities from different entity types of the plurality of entity types;
   causing the final set of entities to be presented concurrently on a computing device of the particular user;
   wherein the method is performed by one or more computing devices;

after causing the final set of entities to be presented concurrently on the computing device of the particular user, adding a new entity type to the plurality of entity types;

after adding the new entity type, identifying a second user;

for each entity type of the plurality of entity types that includes the new entity type:
- based on one or more second attributes of the second user, identifying a second set of entities of said each entity type;
- generating a second ranking of the second set of entities based on one or more criteria that are unique to said each entity type;
- selecting a second subset of the second set of entities and including the second subset in a second final set of entities;

causing the second final set of entities to be presented concurrently on a second computing device of the second user.

7. A method comprising:
identifying a particular user;
for each entity type of a plurality of entity types:
- based on one or more attributes of the particular user, identifying a set of entities of said each entity type;
- generating a ranking of the set of entities based on one or more criteria;
- selecting a subset of the set of entities and including the subset in a final set of entities;

wherein the final set of entities includes entities from different entity types of the plurality of entity types;
causing the final set of entities to be presented concurrently on a computing device of the particular user;
wherein the method is performed by one or more computing devices;
wherein one of the one or more criteria is unique to a first entity type, of the plurality of entity types, and pertains to a first objective that is different than any objective pertaining to a second entity type, of the plurality of entity types, that is different than the first entity type.

8. A method comprising:
identifying a particular user;
for each entity type of a plurality of entity types:
- based on one or more attributes of the particular user, identifying a set of entities of said each entity type;
- generating a ranking of the set of entities based on one or more criteria;
- selecting a subset of the set of entities and including the subset in a final set of entities;

wherein the final set of entities includes entities from different entity types of the plurality of entity types;
causing the final set of entities to be presented concurrently on a computing device of the particular user;
wherein the method is performed by one or more computing devices;
wherein:
- each entity type of the plurality of entity types is associated with a different machine-learned model of a plurality of machine-learned models that includes a first machine-learned model and a second machine-learned model that is different than the first machine-learned model;
- identifying comprises:
  - identifying, for a first entity type, of the plurality of entity types, a first set of entities;
  - identifying, for a second entity type, of the plurality of entity types, a second set of entities;
- generating comprises:
  - using the first machine-learned model, generating a first ranking of the first set of entities;
  - using the second machine-learned model, generating a second ranking of the second set of entities.

9. One or more storage media storing instructions which, when executed by one or more processors, cause:
identifying a particular user;
for each entity type of a plurality of entity types:
- based on one or more attributes of the particular user, concurrently for said each entity type, identifying a set of entities of said each entity type;
- generating a ranking of the set of entities based on one or more criteria;
- selecting a subset of the set of entities and including the subset in a final set of entities;

wherein the final set of entities includes entities from different entity types of the plurality of entity types;
causing the final set of entities to be presented concurrently on a computing device of the particular user.

10. The one or more storage media of claim 9, wherein the instructions, when executed by the one or more processors, further cause:
receiving a request from the computing device, wherein ranking the set of entities is performed in response to receiving the request.

11. The one or more storage media of claim 9, wherein:
selecting a first subset of a first set of entities of the first entity type of the plurality of entity types is performed by a first entity identification component;
selecting a second subset of a second set of entities of the second entity type of the plurality of entity types is performed by a second entity identification component;
the instructions, when executed by the one or more processors, further cause:
- notifying, by the first entity identification component, an initiator process after the first entity identification component selects the first subset of the first set of entities;
- notifying, by the second entity identification component, the initiator process after the second entity identification component identifies the second subset of the second set of entities;
- notifying, by the initiator process, a second pass ranker only after being notified by both the first entity identification component and the second entity identification component.

12. The one or more storage media of claim 9, wherein the plurality of entity types includes two or more of person, hashtag, learning series, event, or group.

13. One or more storage media storing instructions claim 9, when executed by the one or more processors, further cause:
identifying a particular user;
for each entity type of a plurality of entity types:
- based on one or more attributes of the particular user, identifying a set of entities of said each entity type;
- generating a ranking of the set of entities based on one or more criteria;
- selecting a subset of the set of entities and including the subset in a final set of entities;

wherein the final set of entities includes entities from different entity types of the plurality of entity types;
causing the final set of entities to be presented concurrently on a computing device of the particular user;

for each entity type of the plurality of entity types, identifying a number of entities of said each entity type to include in the final set of entities;
randomly assigning entity types to each slot of a plurality of slots in which to insert the final set of entities, wherein the number of entities in the final set of entities is the same as the number of slots in the plurality of slots;
for each entity type of the plurality of entity types, based on the ranking of the set of entities of said each entity type, assigning each entity, in the subset of entities of said each entity type, to a slot of the plurality of slots;
wherein the plurality of slots maintain the ranking of the set of entities of each entity type of the plurality of entity types.

14. One or more storage media storing instructions claim 9, when executed by the one or more processors, further cause:
identifying a particular user;
for each entity type of a plurality of entity types:
based on one or more attributes of the particular user, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user;
after causing the final set of entities to be presented concurrently on the computing device of the particular user, adding a new entity type to the plurality of entity types;
after adding the new entity type, identifying a second user;
for each entity type of the plurality of entity types that includes the new entity type:
based on one or more second attributes of the second user, identifying a second set of entities of said each entity type;
generating a second ranking of the second set of entities based on one or more criteria that are unique to said each entity type;
selecting a second subset of the second set of entities and including the second subset in a second final set of entities;
causing the second final set of entities to be presented concurrently on a second computing device of the second user.

15. One or more storage media storing instructions which, when executed by one or more processors, cause:
identifying a particular user;
for each entity type of a plurality of entity types:
based on one or more attributes of the particular user, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user;
wherein one of the one or more criteria is unique to a first entity type, of the plurality of entity types, and pertains to a first objective that is different than any objective pertaining to a second entity type, of the plurality of entity types, that is different than the first entity type.

16. One or more storage media storing instructions which, when executed by one or more processors, cause:
identifying a particular user;
for each entity type of a plurality of entity types:
based on one or more attributes of the particular user, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user;
wherein:
each entity type of the plurality of entity types is associated with a different machine-learned model of a plurality of machine-learned models that includes a first machine-learned model and a second machine-learned model that is different than the first machine-learned model;
identifying comprises:
identifying, for a first entity type, of the plurality of entity types, a first set of entities;
identifying, for a second entity type, of the plurality of entity types, a second set of entities;
generating comprises:
using the first machine-learned model, generating a first ranking of the first set of entities;
using the second machine-learned model, generating a second ranking of the second set of entities.

17. A system comprising:
one or more processors;
one or more storage media storing instructions which, when executed by the one or more processors, cause:
identifying a particular user;
for each entity type of a plurality of entity types:
based on one or more attributes of the particular user, concurrently, for said each entity type, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user.

18. The system of claim 17, further comprising:
a first entity identification component;
a second identification component; and
wherein the selecting a first subset of a first set of entities of the first entity type of the plurality of entity types is performed by the first entity identification component;
wherein the selecting a second subset of a second set of entities is performed by the second entity identification component; and
wherein the instructions which, when executed by the one or more processors, further cause:
notifying, by the first entity identification component, an initiator process after the first entity identification component selects the first subset of the first set of entities;
notifying, by the second entity identification component, the initiator process after the second entity identification component identifies the second subset of the second set of entities;

notifying, by the initiator process, a second pass ranker only after being notified by both the first entity identification component and the second entity identification component.

19. A system comprising:
one or more processors;
one or more storage media storing instructions which, when executed by the one or more processors, cause:
identifying a particular user;
for each entity type of a plurality of entity types:
based on one or more attributes of the particular user, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user;
for each entity type of the plurality of entity types, identifying a number of entities of said each entity type to include in the final set of entities;
randomly assigning entity types to each slot of a plurality of slots in which to insert the final set of entities, wherein the number of entities in the final set of entities is the same as the number of slots in the plurality of slots;
for each entity type of the plurality of entity types, based on the ranking of the set of entities of said each entity type, assigning each entity, in the subset of entities of said each entity type, to a slot of the plurality of slots;
wherein the plurality of slots maintain the ranking of the set of entities of each entity type of the plurality of entity types.

20. A system comprising:
one or more processors;
one or more storage media storing instructions which, when executed by the one or more processors, cause:
identifying a particular user;
for each entity type of a plurality of entity types:
based on one or more attributes of the particular user, identifying a set of entities of said each entity type;
generating a ranking of the set of entities based on one or more criteria;
selecting a subset of the set of entities and including the subset in a final set of entities;
wherein the final set of entities includes entities from different entity types of the plurality of entity types;
causing the final set of entities to be presented concurrently on a computing device of the particular user;
after causing the final set of entities to be presented concurrently on the computing device of the particular user, adding a new entity type to the plurality of entity types;
after adding the new entity type, identifying a second user;
for each entity type of the plurality of entity types that includes the new entity type:
based on one or more second attributes of the second user, identifying a second set of entities of said each entity type;
generating a second ranking of the second set of entities based on one or more criteria that are unique to said each entity type;
selecting a second subset of the second set of entities and including the second subset in a second final set of entities;
causing the second final set of entities to be presented concurrently on a second computing device of the second user.

* * * * *